United States Patent [19]

Orszulak

[11] 4,448,564
[45] May 15, 1984

[54] RETAINING MEANS FOR IMPACT DRIVE SOCKET

[75] Inventor: Stanley J. Orszulak, Springfield, Mass.

[73] Assignee: Easco Corporation, Baltimore, Md.

[21] Appl. No.: 484,618

[22] Filed: Apr. 13, 1983

[51] Int. Cl.³ .............................................. B25G 3/00
[52] U.S. Cl. ...................................... 403/318; 403/324
[58] Field of Search ............... 403/324, 326, 317, 318, 403/100; 285/315, 316

[56] References Cited

U.S. PATENT DOCUMENTS

| 1,324,654 | 12/1919 | Ferguson | 285/316 X |
|-----------|---------|----------|-----------|
| 2,291,253 | 7/1942  | Osbors   | 403/318   |
| 2,326,317 | 8/1943  | Amtsberg | 403/318   |
| 2,739,000 | 3/1956  | Muirhead | 403/318   |
| 4,026,581 | 5/1977  | Pasbrig  | 285/316 X |
| 4,198,080 | 4/1980  | Carpenter| 285/318 X |

Primary Examiner—Andrew V. Kundrat
Attorney, Agent, or Firm—Leonard Bloom

[57] ABSTRACT

An improved retainer for the locking pin of an impact drive socket features an axially-movable sleeve that surrounds the pin and retains the same. The sleeve may be advanced (or retracted) on the socket, against the bias of a spring, thereby uncovering the locking pin. The pin may be removed to facilitate removal of the impact socket from the drive shank of an impact wrench or other tool.

3 Claims, 7 Drawing Figures

RETAINING MEANS FOR IMPACT DRIVE SOCKET

FIELD OF THE INVENTION

The present invention relates to a retaining means for an impact drive socket, and more particularly, to a spring-loaded sleeve that may be moved axially to uncover a radial bore in the socket, thereby facilitating the removal of a transverse locking pin therefrom.

BACKGROUND OF THE INVENTION

An impact wrench has a clutch which re-engages periodically to deliver a series of repeated hammer blows to an anvil. The anvil may be formed integrally with a drive shank having a portion extending from the tool. The extending portion of the drive shank carries a driven impact socket which engages a nut or bolt head. In order to accommodate the relatively-heavy impact loads, the socket has a square (or other polygonal) cross-sectioned recess to receive the corresponding square cross-sectioned configuration of the drive shank. Moreover, in order to preclude axial displacement of the socket relative to the drive shank, the socket is further keyed to the shank by a transverse locking pin. This pin is received mutually within a transverse bore in the drive shank and a pair of alined radial bores in the socket. Upon removal of the pin, the socket may be removed from the shank.

In the prior art, of which I am aware, various means have been provided for retaining the pin in its normal keying position. For example, in U.S. Pat. No. 2,326,317, the radial bores in the socket are covered by a retainer ring formed from an elastic material. This retainer ring may comprise a rubber band which surrounds the locking pin and frictionally engages the cylindrical surface of the socket member. This rubber band may be removed or shifted manually to uncover the radial bores in the socket and allow the locking pin to be removed. If the rubber band breaks during operation of the tool, the centrifugal forces which are generated by the tool (which is a high-speed power-operated impact wrench) may cause the locking pin to become dislodged, thereby resulting in a safety hazard. Moreover, the rubber band is not convenient to use and may become separated from the tool and misplaced inadvertently.

The prior art has also resorted to various spring-loaded retaining clips for coupling pins. For example, in U.S. Pat. No. 2,739,000, a spring clip has dimpled ends for receiving the respective ends of a coupling pin. This spring-clip retainer must be removed entirely to expose the coupling pin. Furthermore, in U.S. Pat. No. 2,291,253, a collar may be moved axially to expose a locking or coupling pin and facilitate the removal thereof. The collar has an inturned flange surrounding a shaft, and the collar is biased by a coil spring piloted on the shaft and bearing against the flange. While apparently functional for the purposes intended, these prior arrangements are cumbersome and costly and are not readily adaptable to a retainer for the drive socket of a portable power-operated impact wrench.

SUMMARY OF THE INVENTION

Accordingly, it is an object of the present invention to alleviate the disadvantages and deficiencies of the prior art by providing an improved retaining means for an impact drive socket.

It is another object of the present invention to provide a retaining means which may be manipulated conveniently without risk of becoming separated from the tool, lost or misplaced.

It is yet another object of the present invention to provide a retaining means for an impact drive socket which may be manufactured easily and economically.

It is a further object of the present invention to provide a manually-manipulatable retaining member which has a two-position detented connection with an impact socket for a high-speed power-operated impact wrench, thereby providing for a solid retention of the socket and accommodating the relatively severe vibrational and shock loads normally encountered during operation of the wrench.

In accodance with the teachings of the present invention, a sleeve is carried by the socket and has a normal position covering the radial bore therein, thereby retaining the pin. Resilient means biases the sleeve in its normal position. Means are provided for moving the sleeve axially against the bias of the resilient means and into an alternate position to uncover the radial bore in the socket, whereby the pin may be removed to remove the socket from the shank.

In a preferred embodiment, a split ring is received in an external annular groove in the socket, the ring having a portion protruding radially therefrom. A pair of spaced-apart internal annular grooves is formed within the sleeve. The protruding portion of the ring is received within one of the internal annular grooves (in the normal position of the sleeve) and the sleeve may be pushed manually to compress and ride over the ring, whereby the ring will be received in the other internal annular groove in the sleeve (in the alternate position of the sleeve). The arrangement provides a positive two-position detented "snap action" for the sleeve. Moreover, during the operation of the power tool, the centrifugal forces generated thereby will assist in retaining the split ring in the respective internal groove in the retaining sleeve for the pin.

These and other objects of the present invention will become apparent from a reading of the following specification taken in conjunction with the enclosed drawings.

DESCRIPTION OF THE PREFERRED EMBODIMENT

Figure 1:
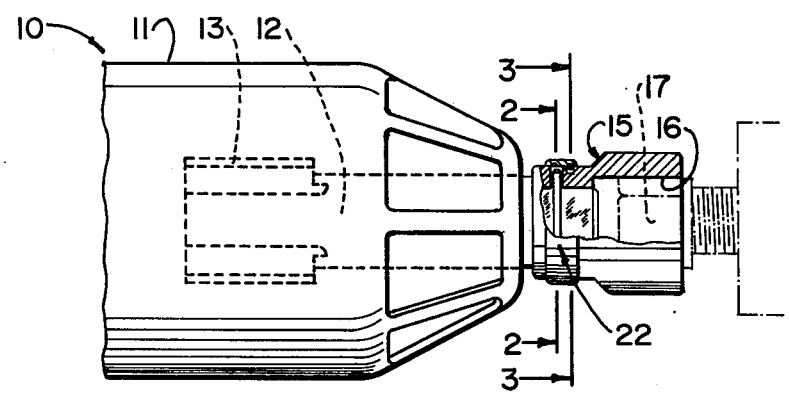
FIG. 1 is side elevation of a portion of a typical power-operated wrench and drive socket, showing a preferred embodiment of the socket retaining means of the present invention.
Figure 2:
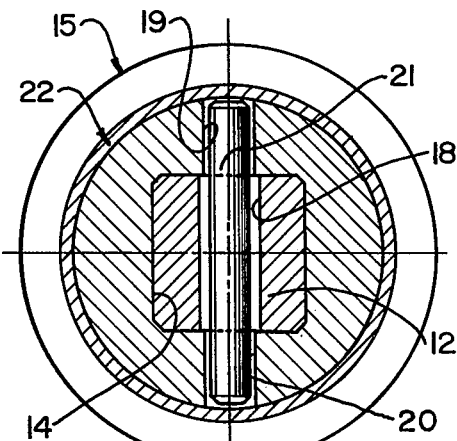
FIG. 2 is a section view, taken across the lines 2—2 of FIG. 1, and showing the transverse locking pin.

With reference to FIGS. 1 and 2, there is illustrated a portable power-operated impact wrench 10 with which the teachings of the present invention may find more particular utility. The wrench 10 is conventional, hence has been shown broken away for ease of illustration. Moreover, it will be appreciated by those skilled in the art that the teachings of the present invention are not restricted to the particular wrench 10, but rather are equally applicable to a wide variety of tools and implements. With this in mind, the wrench 10 includes a clutch housing 11 having a driven shank 12 journaled therein. Preferably, the drive shank is formed integrally with an anvil 13. The anvil is part of an impact clutch, which (being conventional) has been omitted for ease of illustration. The drive shank has a square (or other polygonal configuration) and is received within a corresponding square cross-sectioned recess 14 formed within the rearward portion of an impact socket 15. The socket is provided with a hexagonal (or other polygonal) socket portion 16 for accommodating a conventional nut or bolt head 17. The portion of the drive shank which projects beyond the tool has a transverse through bore 18 formed therein. This transverse bore communicates with a pair of diametrically-opposed radial pockets or bores 19 and 20 formed in the socket. A locking pin 21 (or other element) is received mutually in the transverse bore and aligned radial bores for further keying the socket to the drive shank and precluding axial displacement therefrom. It will be appreciated that any suitable clearances may be chosen between the pin 21 and the bore 18, and between the pin 21 and the radial bores 19,20, and that the clearances illustrated in FIG. 2 are only exemplary.

Figure 3:
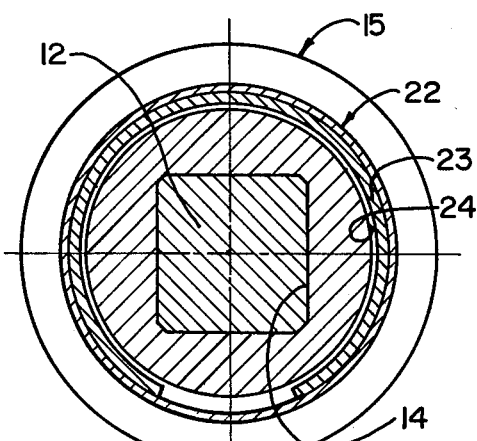
FIG. 3 is a section view, taken across the lines 3—3 of FIG. 1, showing the split ring for facilitating a two-position detented snap action for the retaining sleeve.
Figure 4:
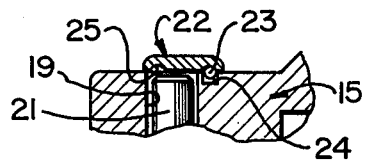
FIG. 4 is an enlarged portion of FIG. 1, showing the retaining sleeve in its normal position to retain the locking pin.

With reference to FIGS. 3 and 4, a sleeve 22 is carried by the socket and has a normal position in which the sleeve covers the radial bores in the socket and precludes removal of the pin. A split ring 23 is seated in an external annular groove 24 in the socket, as shown more clearly in FIG. 4, and has a portion protruding radially therefrom. The sleeve has a pair of spaced-apart internal annular grooves 25 and 26 formed therein. In the normal position of the sleeve (as shown in FIGS. 1 and 4) the ring is received within internal groove 26 in the sleeve. The sleeve with the grooves therein may be formed by any suitable means, such as machining, rolling or investment casting. Also, if desired, the sleeve may be integrally molded from a suitable relatively-hard plastic material.

Figure 5:
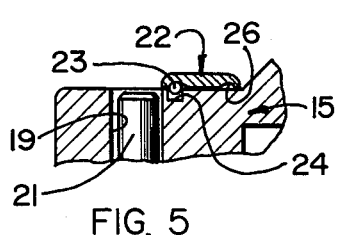
FIG. 5 corresponds to FIG. 4, but shows the retaining sleeve retracted into its alternate position to facilitate removal of the locking pin, thereby facilitating removal of the socket from the shank.

In operation, the sleeve 22 may be grasped and pushed forwardly on the socket 15, such that the sleeve compresses and rides up over the split ring 23, and such that the ring is received in the other internal groove 25 with a click or "snap action". The radial bores 19 and 20 are uncovered (as shown in FIG. 5) and the locking pin 21 may be removed, thereby facilitating removal of the impact socket from the drive shank. Conversely, when the socket (or a different-sized socket having the same input drive configuration) is replaced on the drive shank, and when the locking pin is again inserted therebetween, the sleeve 22 may be manually retracted on the socket, again with a "snap action" as the ring 23 is again seated within the internal groove 26 (as shown in FIGS. 1 and 4). With this arrangement, a two-position detented "snap-action" is provided for the sleeve, the normal position of the sleeve being shown in FIG. 4 and its alternate position in FIG. 5.

Thus it will be appreciated by those skilled in the art that the present invention provides a simple, effective and inexpensive retaining means for the conventional locking pin (or other locking or coupling element) for an impact drive socket. The retaining sleeve has a convenient two-position detented connection on the socket, which allows the sleeve to be easily advanced or retracted manually; however, the detented connection is sufficiently rigid to preclude an inadvertent shifting of the sleeve during operation of the tool, and in particular, an impact wrench in which rather severe vibrational and shock loads are normally encountered. Moreover, the retaining sleeve cannot be dislodged or removed inadvertently from the tool (without employing the proper implements and a deliberate manual effort) and thus the sleeve may not be lost or misplaced.

Figure 6:
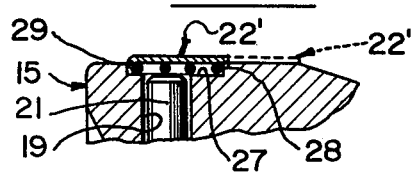
FIG. 6 corresponds to FIG. 4, but illustrates a first alternate embodiment.

With reference to FIG. 6, a first alternate embodiment is illustrated, wherein the socket has an external annular groove or recess 27 formed therein (in communication with the radial bore 19 (and with the radial bore 20, not shown). A coiled compression spring 28 is seated in the groove and overlays the radial bores and the locking pin lodged therein. A sleeve 22' has an inturned annular flange 29 formed thereon. The flange 29 is seated between one edge of the groove and the first coil of the spring 28, thereby retaining the sleeve 22' on the socket. The flange 29 may be segmented circumferentially (not shown) to provide ready access to the spring and facilitate assembly of the parts.

Figure 7:
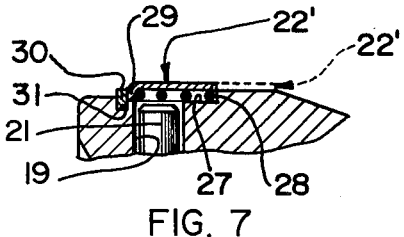
FIG. 7 corresponds to FIG. 4, but illustrates a second alternate embodiment.

With reference to FIG. 7, a second alternate embodiment is illustrated, wherein a retaining ring 30 is carried in an annular groove 31 on the socket, and wherein the annular flange 29 of the sleeve 22' is seated between the retaining ring and the adjacent coil of the spring 28.

To remove the pin 21 (in the embodiments of FIGS. 6 and 7) the sleeve 22' is pushed axially against the force of the spring 28; the sleeve is held in place (as indicated by the broken lines) while the pin is removed, and then the spring-loaded sleeve is released to its normal position.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. In combination with a socket carried by the drive shank of a power-operated tool, wherein the socket has at least one radial bore formed therein, wherein the shank has a transverse bore formed therein in communication with the radial bore in the socket, and wherein a locking pin is received mutually within the radial bore and transverse bore, respectively, the improvement in socket retaining means comprising a sleeve carried by the socket and having a normal position covering the radial bore therein, thereby retaining the pin, resilient means biasing the sleeve in its normal position, and means for moving the sleeve axially against the bias of the resilient means and into an alternate position to uncover the radial bore in the socket, whereby the pin may be removed to remove the socket from the shank, wherein the resilient means comprises a split ring, the socket having an external annular groove receiving the ring, the ring having a portion protruding radially of the external groove, and the sleeve having a pair of spaced-apart internal annular grooves formed therein, whereby the ring is received in one of the internal grooves in the sleeve in the normal position of the sleeve, and whereby the sleeve may be pushed manually to compress and ride over the ring, whereby the ring will be received in the other internal annular groove in the sleeve in the alternate position thereof, thereby providing a two-position detented action for the sleeve.

2. In combination with a socket carried by the drive shank of a power-operated tool, wherein the socket has at least one radial bore formed therein, wherein the shank has a transverse bore formed therein in communication with the radial bore in the socket, and wherein a locking pin is received mutually within the radial bore and transverse bore, respectively, the improvement in socket retaining means comprising a sleeve carried by the socket and having a normal position covering the radial bore therein, thereby retaining the pin, resilient means biasing the sleeve in its normal position, and means for moving the sleeve axially against the bias of the resilient means and into an alternate position to uncover the radial bore in the socket, whereby the pin may be removed to remove the socket from the shank, wherein the resilient means comprises a coil spring, the socket having an external annular groove in communication with the radial bore in the socket, the coil spring being seated in the groove and overlaying the pin, and the sleeve having an inturned annular flange seated between one end of the groove and the coil spring, thereby retaining the sleeve.

3. In combination with a socket carried by the drive shank of a power-operated tool, wherein the socket has at least one radial bore formed therein, wherein the shank has a transverse bore formed therein in communication with the radial bore in the socket, and wherein a locking pin is received mutually within the radial bore and transverse bore, respectively, the improvement in socket retaining means comprising a sleeve carried by the socket and having a normal position covering the radial bore therein, thereby retaining the pin, resilient means biasing the sleeve in its normal position, and means for moving the sleeve axially against the bias of the resilient means and into an alternate position to uncover the radial bore in the socket, whereby the pin may be removed to remove the socket from the shank, wherein the resilient means comprises a cil spring, the socket having an external annular recess in communication with the radial bore in the socket, the coil spring being seated in the recess and bridging the radial bore so as to overlay the pin, a retaining ring carried by the socket, and the sleeve having an inturned annular flange seated between the retaining ring and the coil spring, thereby retaining the sleeve.

* * * * *